United States Patent
Galtarossa et al.

(10) Patent No.: US 10,634,551 B2
(45) Date of Patent: Apr. 28, 2020

(54) REFLECTOMETRIC VIBRATION MEASUREMENT SYSTEM AND RELATIVE METHOD FOR MONITORING MULTIPHASE FLOWS

(71) Applicant: Eni S.p.A., Rome (IT)

(72) Inventors: Andrea Galtarossa, Padua (IT); Luca Palmieri, Selvazzano Dentro (IT); Massimo Zampato, Salzano (IT)

(73) Assignee: Eni S.P.A., Rome (IT)

( * ) Notice: Subject to any disclaimer, the term of this patent is extended or adjusted under 35 U.S.C. 154(b) by 23 days.

(21) Appl. No.: 15/538,832

(22) PCT Filed: Dec. 23, 2015

(86) PCT No.: PCT/IB2015/059913
§ 371 (c)(1),
(2) Date: Jun. 22, 2017

(87) PCT Pub. No.: WO2016/103201
PCT Pub. Date: Jun. 30, 2016

(65) Prior Publication Data
US 2018/0136036 A1  May 17, 2018

(30) Foreign Application Priority Data
Dec. 23, 2014   (IT) .............................. MI2014A2244

(51) Int. Cl.
*G01D 5/26* (2006.01)
*G01K 11/32* (2006.01)
(Continued)

(52) U.S. Cl.
CPC ............. *G01H 9/004* (2013.01); *G01D 5/268* (2013.01); *G01K 11/32* (2013.01);
(Continued)

(58) Field of Classification Search
CPC ........ G01H 9/004; G01D 5/268; G01K 11/32; G01K 2011/324; G01M 11/3154; G01M 11/319; G02B 6/02319
(Continued)

(56) References Cited

U.S. PATENT DOCUMENTS 4,545,253 A     10/1985  Avicola et al.
5,077,814 A  *  12/1991  Shigematsu ............. G02B 6/14
                                                        385/24
(Continued)

FOREIGN PATENT DOCUMENTS

CN    203519149 U        4/2014
GB    002443661     *    5/2008

OTHER PUBLICATIONS

International search report and Written Opinion for PCT/IB2015/059913, dated Mar. 3, 2016, 13 pages.
(Continued)

*Primary Examiner* — Jacques M Saint Surin
(74) *Attorney, Agent, or Firm* — Praedcere Law

(57) ABSTRACT

Reflectometric vibration measurement system to monitor multiphase flows in production wells or pipelines using multimode fibers comprising: —a sensing multimode optical fiber; —an optical source with at least one fiber output port, which generates optical pulses which are to be sent to the sensing fiber; —an optical receiver with at least one multimode fiber input port; —an optical device with at least 3 multimode fiber ports, in which one port is connected to the optical source, one port to the optical receiver, and one port to the sensing multimode fiber; —a system for processing the output signals from the optical receiver, further comprising more than one spatial mode filter. A process for
(Continued)

Figure 1:
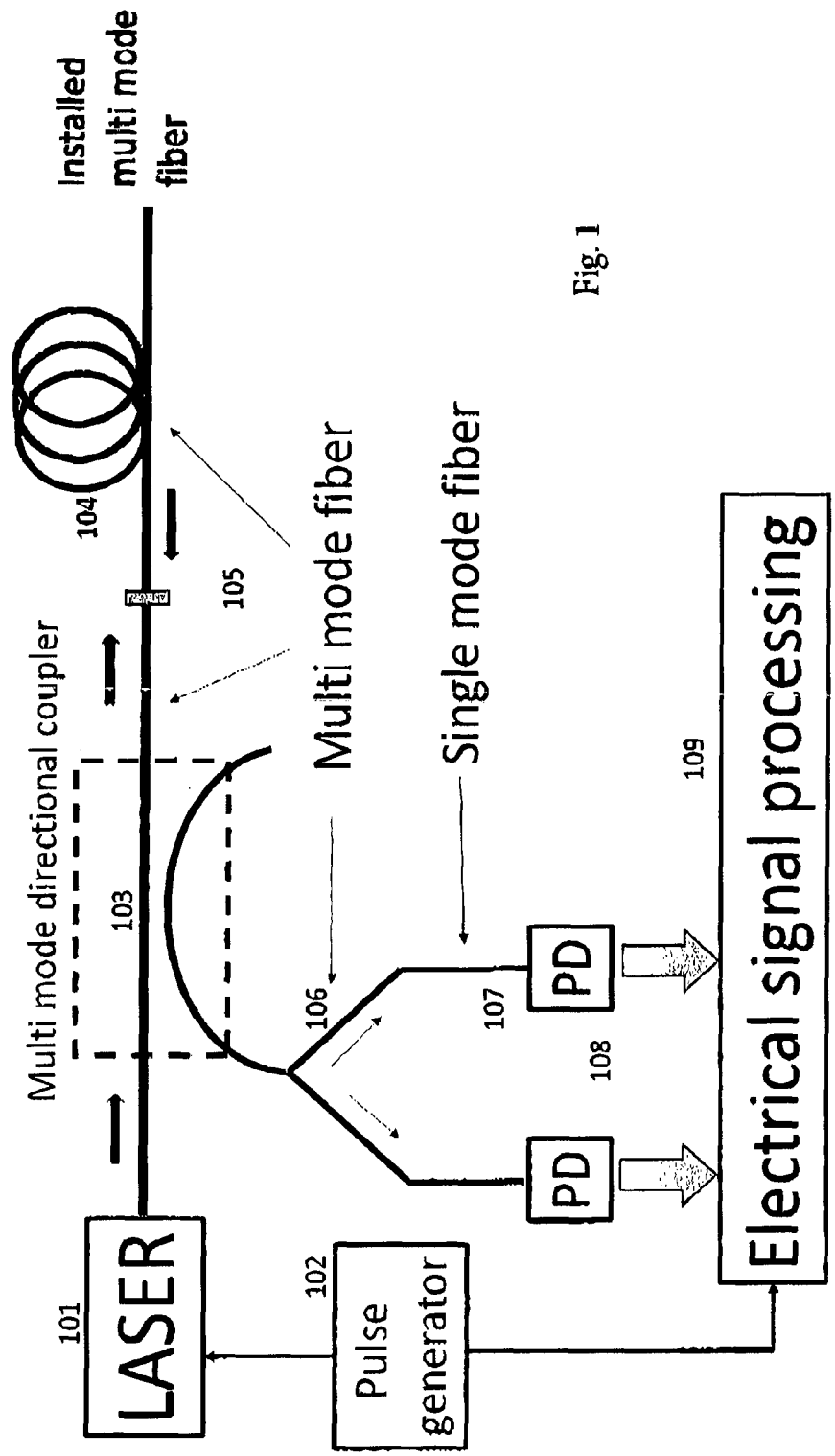

reconfiguring an optical reflectometry system which has already been installed in a monitoring structure is also described.

28 Claims, 7 Drawing Sheets

(51) Int. Cl.
    *G01M 11/00*     (2006.01)
    *G02B 6/02*     (2006.01)
    *G01H 9/00*     (2006.01)

(52) U.S. Cl.
    CPC ...... *G01M 11/319* (2013.01); *G01M 11/3154* (2013.01); *G02B 6/02319* (2013.01); *G01K 2011/324* (2013.01)

(58) Field of Classification Search
    USPC .......................................................... 73/655
    See application file for complete search history.

(56) References Cited

U.S. PATENT DOCUMENTS

| | | | |
|---|---|---|---|
| 5,592,282 A | 1/1997 | Hartog et al. | |
| 5,708,500 A * | 1/1998 | Anderson | G01M 11/3145 250/227.15 |
| 5,848,204 A | 12/1998 | Wanser et al. | |
| 7,668,411 B2 | 2/2010 | Davies et al. | |
| 8,077,314 B2 * | 12/2011 | Davies | G01K 11/32 356/344 |
| 8,333,505 B2 * | 12/2012 | Lee | G01K 11/32 374/137 |
| 2007/0199696 A1 * | 8/2007 | Walford | E21B 43/2406 166/250.01 |
| 2008/0246947 A1 * | 10/2008 | Lees | G01K 11/32 356/51 |
| 2009/0214154 A1 | 8/2009 | Kashiwagi et al. | |
| 2009/0304322 A1 * | 12/2009 | Davies | G01H 9/004 385/12 |
| 2011/0235970 A1 * | 9/2011 | Flora | G01M 11/3154 385/28 |
| 2013/0222811 A1 * | 8/2013 | Handerek | G01M 11/3127 356/477 |
| 2016/0123837 A1 * | 5/2016 | Chen | G01M 11/088 356/73.1 |

OTHER PUBLICATIONS

S J Mullens et al: "OTC 20429 Fiber-Optic Distributed Vibration Sensing Provides Technique for Detecting Sand Production", Offshore Technology Conference held in Houston, May 6, 2010, pp. 3-6.

* cited by examiner

REFLECTOMETRIC VIBRATION MEASUREMENT SYSTEM AND RELATIVE METHOD FOR MONITORING MULTIPHASE FLOWS

This invention relates to a reflectometric vibration measurement system and a relative method for monitoring multiphase flows, in particular in production wells or pipelines, using multimode optical fibers.

Most non-optical techniques do not make provision for direct mechanical interaction with the flow (with the exception of Venturi tubes and/or flow mixers), but are based on interactions with radiation of various kinds. Thus there are gamma ray, X-ray and ultrasonic tomography, electrical impedance tomography and the analysis of dielectric constants using microwaves. Because of their nature these techniques are not suitable for use at the wellhead.

In general optical sensors can be subdivided into two classes: those sensors which we will call "direct", in which light radiation interacts with the flow, and "indirect" sensors, in which the light radiation does not interact with the flow.

Direct sensors generally make use of total internal reflection phenomena, attenuation of the transmitted or evanescent wave and fluorescence to estimate the composition of the flow, often using spectroscopic techniques. Direct sensors also include examples of optical tomographs.

In the case of indirect sensors on the other hand the optical radiation is used to measure the temperature or deformation induced in the sensor (whether a fiber, a resonant cavity or other) by the pipeline, the structure of the well or even directly from the flow itself. It will be noted that in the case of the indirect sensors of interest the physical parameters measured are not just temperature or deformation; information about other parameters can be deduced from these. In particular, deformation measurements correspond to pressure or vibration measurements in which two situations are often distinguished by the frequency band of the phenomenon observed. Vibration is therefore identified as acoustic energy, and thus one of the most useful optical fiber vibration sensors is marketed as a distributed acoustic sensor. Information about multiphase flow structure is finally deduced from these basic physical measurements through suitable physical models and processing of the raw data.

It is worthwhile pointing out the very important role played by distributed optical fiber sensors in this context. In the context of measuring multiphase flow, distributed measurements of temperature and vibration which provide a continuous map with sufficient spatial resolution for the entire well are of interest, making it possible to estimate flow properties through suitable calculation algorithms. It will be noted that these distributed measurements are only possible with technologies based on use of the backscattered signal generated by the optical fiber.

Several optical fibers of multi-mode type, generally of silica, are often installed within a well or in its immediate vicinity, in a position parallel to the well. These fibers have two typical uses: for the transmission of two-directional data on the bottom-hole/surface bus, or as a distributed temperature sensor using a Raman technique.

A different use for such already installed fibers is proposed in U.S. Pat. No. 7,668,411 by Schlumberger Tech. Corp. to provide a distributed vibration sensor through spatial analysis of the backscattered signal due to the Rayleigh effect.

The measurement instrument is an OTDR with a highly coherent pulsed optical source, typically a DFB laser; due to the high spatial coherence of the source the backscattered signal due to the scattering points within the optical pulse induces an interference signal in the receiver.

Through its nature, measurement based on Rayleigh scattering is simpler if the fiber used is of the single mode type. The solution proposed in U.S. Pat. No. 7,668,411 provides for the insertion of a "single spatial mode filtering system" between the coherent OTDR and the multimode fiber (see FIGS. 3, 4, 5 and 6 of the patent). Again in the said patent the "single spatial mode filtering system" is for example provided using a single mode fiber or a pinhole in air.

The solution described in that patent has the following three technical critical points:

I. Use of the "single spatial mode filtering system" (as for example a single mode fiber beam splitter) placed between the laser source and the multimode sensing fiber is generally a source of great attenuation in the measurement signal; the typical attenuation in a joint between a single mode fiber and a multimode fiber may vary from 6 to 15 dB. This loss will have a very adverse effect on the signal-to-noise ratio (SNR), limiting the length of the measurable fiber, spatial resolution, the vibration band or sensitivity to it. The loss is even greater if a pinhole in air is used to provide the "single spatial mode filter" as suggested in U.S. Pat. No. 7,668,411.

II. It may happen that the "single spatial mode" selected is temporarily insensitive to well vibrations. This problem is described in U.S. Pat. No. 7,668,411, and in that patent it is suggested that the problem be overcome by selecting a different "speckle"; however there is no description whatsoever as to how this selection should be made.

III. The interpretation of distributed vibration measurements may give rise to critical points. It will not be forgotten in fact that the aim of the patent is the reuse of multimode fibers which are already installed in wells for other purposes, and are not therefore necessarily optimized for measuring vibration. Multimode optical fibers are often preferred to single mode fibers for installation in production wells because of the greater ease of making joints. This aspect makes the configuration of the vibration measurement system suboptimal, and makes the definition of accurate mathematical models capable of linking the vibration measurements made to multiphase flow properties more complex.

A new system which resolves the three problems listed above both by eliminating the "single spatial mode filter" specified in U.S. Pat. No. 7,668,411 and by placing a suitable optical device having at least 3 ports based on multimode fiber between the source, the multimode measurement fiber and the receiver has now been found. This ensures a better signal/noise ratio which could be used to improve dynamics, resolution or sensitivity.

With regard to the distributed measurement of vibrations in multimode fibers the invention makes it possible to overcome some of the intrinsic problems in the solution known in the literature, which provides for the use of monomode fiber between the receiver and the multimode measurement fiber. In the case in point the innovation makes it possible to minimize insertion losses due to the coupling between the monomode fiber and the multimode fiber, thus increasing the quality of measurement. In addition to this, the innovation makes it possible to monitor all "speckles" of the backscattered signal at the same time, thus making it intrinsically immune to the problem of the fading of individual "speckles", which would otherwise afflict the system known in the literature. The reflectometric system for the measurement of vibration which is the subject of this invention for the monitoring of multiphase flows, in particular in production wells or pipelines, using multimode fibers, comprises:
- a sensing multimode optical fiber;
- an optical source with at least one fiber output port, which generates optical pulses which are to be sent to the sensing fiber;
- an optical receiver with at least one multimode fiber input port;
- an optical device with at least 3 multimode fiber ports, in which one port is connected to the optical source, one port to the optical receiver, and one port to the sensing multimode fiber;
- a system for processing the output signals from the optical receiver, further comprising more than one spatial mode filter.

The optical receiver may preferably comprise a photodiode or several photodiodes. The photodiode or photodiodes may preferably be of the segmented area type, with at least 2 separate measurement segments, more preferably 4.

The optical receiver may also comprise a fiber with few spatial modes connected between the input to the receiver and the segmented area photodiode or photodiodes (such that the said fiber is not monomode). The guided modes of the fiber should number fewer than 17, even counting degenerate modes, more preferably fewer than 13, even more preferably fewer than 7.

When at least two photodiodes are present the optical receiver may also comprise:
- either a multimode fiber power splitter, in which the said splitter has 1 input port and a number of output ports substantially equal to the number of photodiodes, the input port of the splitter being connected to the input port of the receiver and each output port of the splitter being connected to each photodiode through a length of monomode fiber in which the monomode fibers can be connected to the multimode fiber through an adiabatic mode converter;
- or a "photonic lantern" with a multimode input and a number of monomodal fiber outputs substantially equal to the number of photodiodes, the input port of the lantern being connected to the input of the optical receiver and each monomode output of the lantern being connected to each photodiode.

The optical device having at least 3 multimode fiber ports may preferably be selected from:
- a directional coupler;
- a power coupler/splitter;
- a circulator;
- an optical switch The optical source may preferably comprise:
- a high coherence laser which emits a modulated signal from the output port of the optical source;
- a high coherence laser which generates continuous light and an optical modulator connected to the said laser, where the said modulator generates optical signals which are sent to the output port of the source.

If a heterodyne version of the reflectometric system according to the invention is desired, in its more general composition this comprises the following specific features:
- the optical source has two output ports and emits a modulated optical signal which is at a first frequency from a first port and a modulated optical signal at a second frequency from a second port;
- the optical receiver has two input ports of which one is multimode and one monomode, where the said multimode port is connected to the optical device with at least 3 multimode fiber ports and the said monomode port is connected to the said second port of the optical source.

In the case of the heterodyne version the optical source may preferably comprise a laser which emits continuous light and a 3 port acoustic-optical modulator, in which the input port of the modulator is connected to the laser and the two output ports of the modulator constitute the output ports of the source, and in which the modulator is configured in such a way as to send short pulses to a first port and substantially longer pulses to the second port, where the said second port is connected to the monomode port of the optical receiver.

Again in the case of the heterodyne version the optical receiver may preferably also comprise a polarization coupler/splitter (polarization beam splitter) with 2 inputs and 2 outputs and two photodetectors, the said polarization coupler/splitter having:
- a first input connected to the multimode port of the optical receiver and a second input connected to the monomode input of the optical receiver;
- two outputs connected to each of the two photodetectors;
- the two inputs provided with optical systems capable of collimating the input optical beams;
- the collimator of the second monomode input being dimensioned in such a way as to generate a collimated beam which substantially overlaps the fundamental mode of the first multimode input.

The photodetectors are preferably segmented area photodiodes having at least 2 segments.

The monomode input collimator of the coupler/splitter is preferably dimensioned to generate a collimated beam which substantially uniformly illuminates the segmented area photodiodes.

A fiber with few modes is preferably placed between the multimode input of the receiver and the corresponding input of the polarization coupling/splitter, the said fiber with few modes not being monomode.

The guided modes of the fiber with few spatial modes preferably number fewer than 17, also counting degenerate modes, more preferably fewer than 13, even more preferably fewer than 7.

Again in the case of the heterodyne version the optical receiver may as an alternative comprise:
- a spatial demultiplier with 1 multimode input and at least two monomode outputs, where the said multimode input is connected to the multimode input of the optical receiver;
- an optical splitter with 1 input and a number of outputs equal to the monomode outputs of the said spatial demultiplier, where the said input is connected to the monomode input of the optical receiver;
- a number of photodetectors equal to the number of monomode outputs from the said spatial demultiplier;
- a number of optical couplers equal to the number of monomode outputs of the said spatial demultiplier, where each coupler combines each monomode output from the spatial demultiplier with a different output from the said optical divisor and passes the combined light to one of the photodetectors.

The special demultiplier may comprise a multimode fiber power splitter in which a monomode fiber is connected to each multimode output.

The monomode fibers may be connected to the said multimode outputs through adiabatic mode converters.

The spatial demultiplier may also be a "photonic lantern".

A further object of this application is a method for measuring vibration along a structure using the system as specified above which comprises:
- finding a multimode "sensing" optical fiber installed along the structure which has to be monitored;
- emitting a light pulse into the said "sensing" optical fiber;
- selecting one or more speckles of the backscattered light from the "sensing" fiber due to Rayleigh scattering induced by the emitted pulse;
- generating a signal which is indicative of the vibrations along the structure monitored from the multiple speckles collected from the fiber.

The said method may also comprise the use of a multimode fiber to deliver the backscattered light to the optical receiver.

For collecting the multiple speckles, use is preferably made of:
- either a segmented area photodiode;
- or a multimode fiber power splitter with 2 or more output ports, where each output is connected to a photodiode;
- or a photonic lantern.

A further object of this application is the method for measuring vibration along a structure using a heterodyne system in accordance with the invention which comprises:
- dividing the light induced by a source into two different paths;
- modulating the light in the first path to form the optical pulse which is emitted into the "sensing" fiber, while the light in the second optical path has an optical frequency which is different from that in the first;
- combining the light in the second path with each of the multiple speckles collected from the "sensing" fiber;
- detecting only the signal at a frequency equal to the difference between the frequency of the light in the first path and that of the light in the second.

A further object of this application is the process for reconfiguring an optical time domain reflectometry system which has already been installed in the structure that has to be monitored.

Mapping of vibrations along a well may be carried out in a non-invasive manner using a reflectometry technique based on coherent Rayleigh scattering, using already installed optical fibers. In particular the backscattered signal is analyzed, and through using two (or more) receivers in parallel it is possible to process the speckle of the modes that have a spatial and temporal behavior that varies because of external disturbances, typically strain, temperature and vibration. While strain and temperature vary slowly, vibrations are because of their nature rapidly variable in time and space, and this makes it easier to identify them and subsequently analyze them. Spatial mapping of temperature, strain and vibration (along the well) makes it possible to identify malfunctions, changes in the composition of the multiphase flow, the development of bottlenecks resulting from the deposition of hydrates, etc., in real time.

It is known that vibration measurement can be very much more accurate if performed using a monomode fiber; as a consequence, if it is wished to use multimode fibers already installed in wells a deterioration in performance in comparison with the optimum has to be accepted. The innovative idea comprises making use of the same multimode fiber to interrogate local sensors installed along the well, to integrate the distributed measurements of vibration with other physical parameters. These local sensors may be installed during maintenance of the well, possibly as objects already incorporated in specific components of the well itself (for example valves, etc.). The measured parameter may also be vibration, but located at the point of application of the sensor, or total internal reflection with a view to direct analysis of the three-phase flow as already described in the state of the art. The individual sensors may be addressed using wavelength multiplexing techniques, so that the same multimode fiber can be used to perform a distributed measurement of vibration and interrogate local sensors at the same time.

The process according to the invention for reconfiguring an optical reflectometry system comprising a multimode optical "sensing" fiber installed along the said structure, a source to deliver pulses to the said "sensing" multimode fiber, an optical receiver to receive the backscattered light from the said "sensing" fiber due to Rayleigh scattering induced by the pulse delivered, substantially comprises placing a device for spatially separating the multiple speckles of the light backscattered through Rayleigh scattering between the "sensing" fiber and the optical receiver.

The device for the spatial separation of multiple speckles may preferably comprise:
- a multimode fiber power splitter, each output of which is connected to a photodiode;
- a multimode fiber connected to a segmented area photodiode;
- a photonic lantern, each output of which is connected to a photodiode.

The said procedure may also comprise generating an indicative signal of the vibration, along the structure monitored, through an analysis system based on multiple recorded speckles.

Some examples demonstrating the effectiveness of the proposed system are provided for better description of the invention.

EXAMPLE 1

The diagram is illustrated in FIG. 1.

A high coherence laser 101 with an emission wavelength lying typically between 800 and 1650 nm (preferably between 1300 and 1650 nm) controlled by an electrical signals generator (pulse generator) 102, emits optical pulses typically lasting 3-200 ns (preferably 20-100 ns) with a repetition frequency of approximately at least 1 kHz which enter an input port of a 3 dB directional coupler (multimode directional coupler) 103 connected to the multimode measurement fiber multimode fiber) 104 through an optical connector 105. The signal backscattered from the installed multimode fiber enters coupler 103 via optical connector 105 and a fraction of the signal enters the second coupler 106, all made using multimode fibers of preferably the same type as the measurement multimode fiber to reduce coupling losses and spurious reflections. 2 receivers 108 with a single mode tail (single mode fiber) 107 which measure two different portions of the multimode speckle are connected to the output of coupler 106. Downstream from the two photodiodes (PD) 108 connected to generator 102 there is a board 109 for processing the backscattered optical signals and the control signal from the electrical signals generator (electrical signal processing).

EXAMPLE 2

Figure 2:
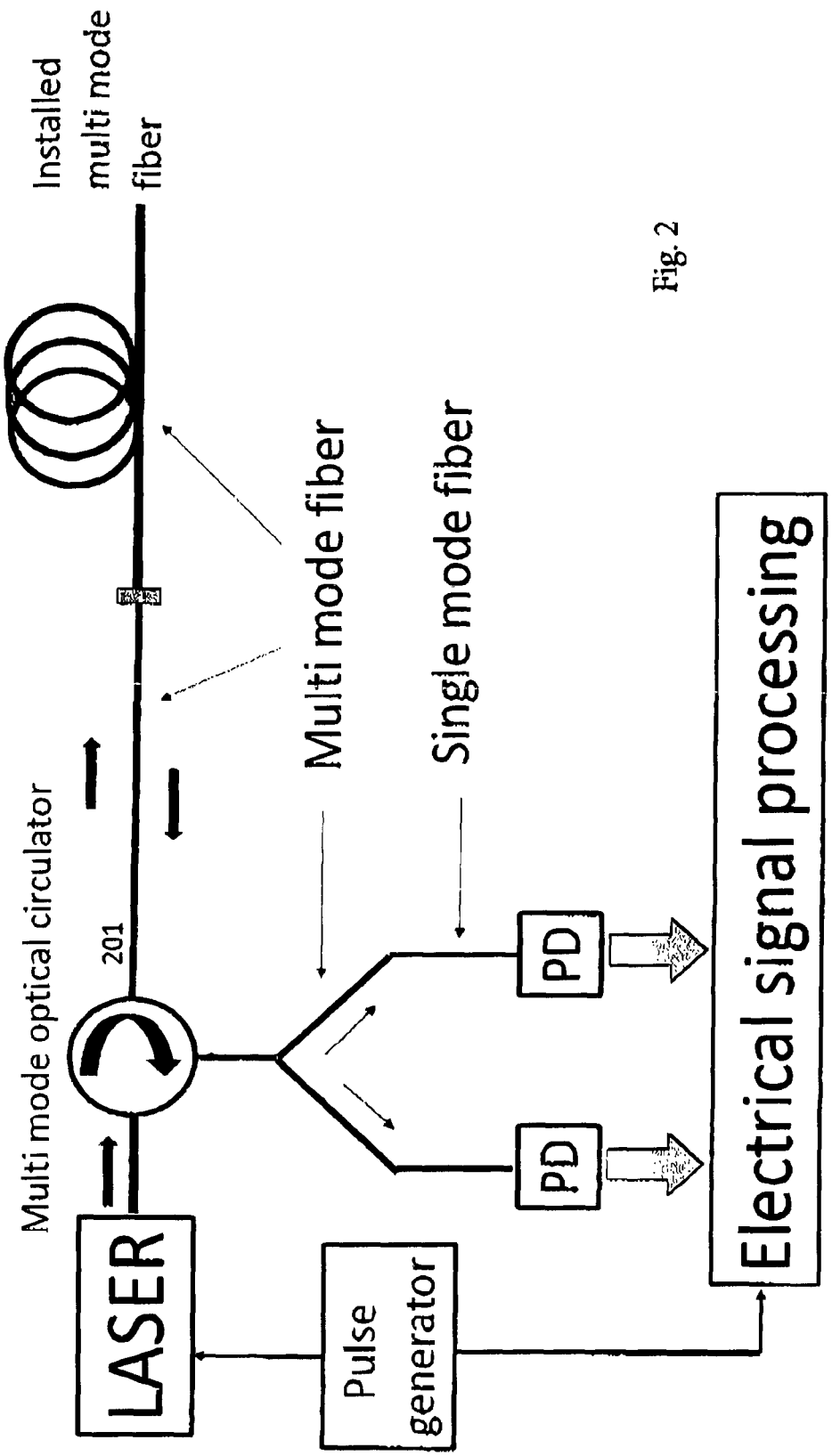

The diagram shown in FIG. 2 is similar to that in FIG. 1 in which coupler 103 is replaced by a 3 port optical circulator (multimode optical circulator) 201, with insertion losses of typically 1 dB and a directivity of more than 40 dB.

EXAMPLE 3

Figure 3:
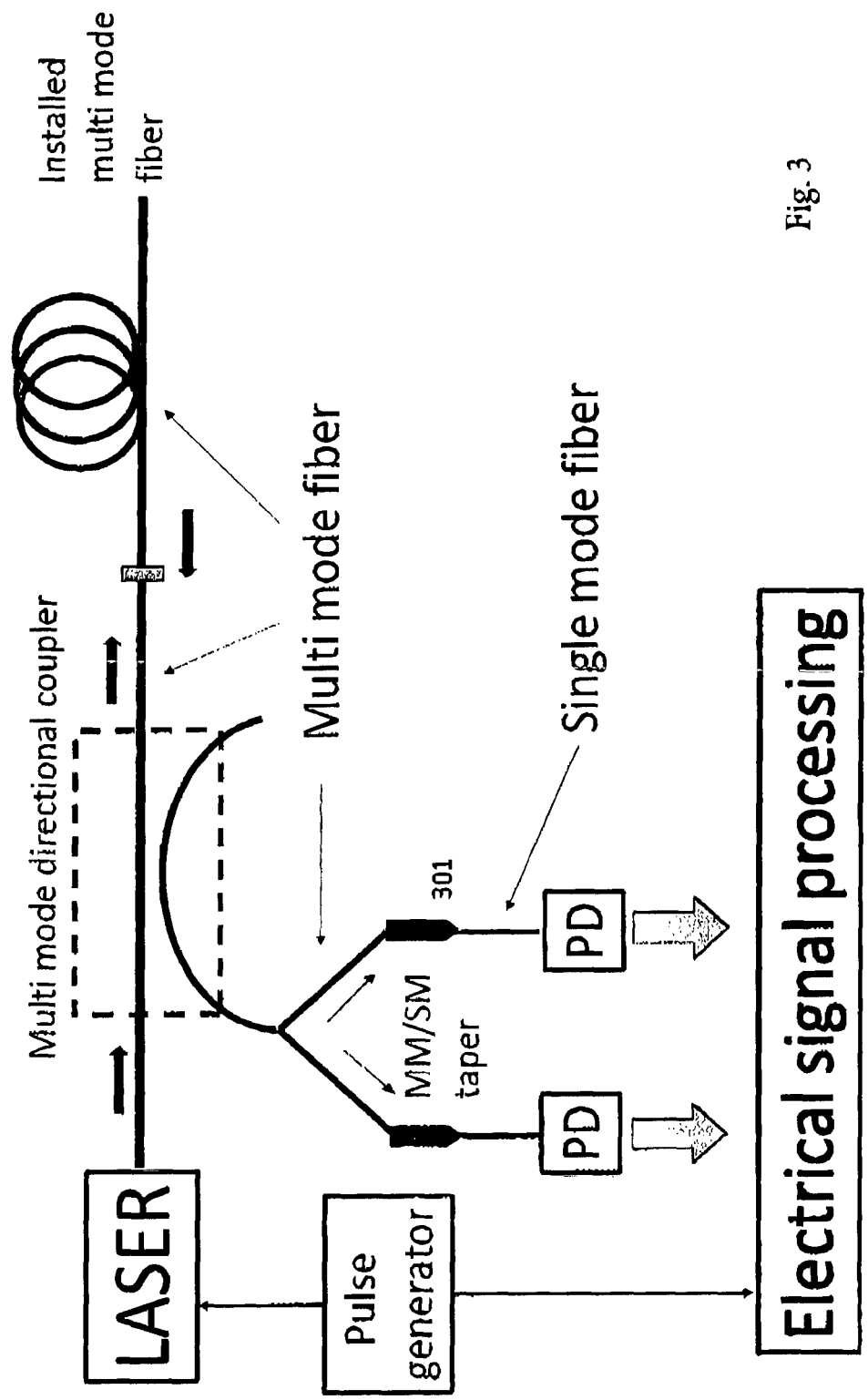
Figure 6:
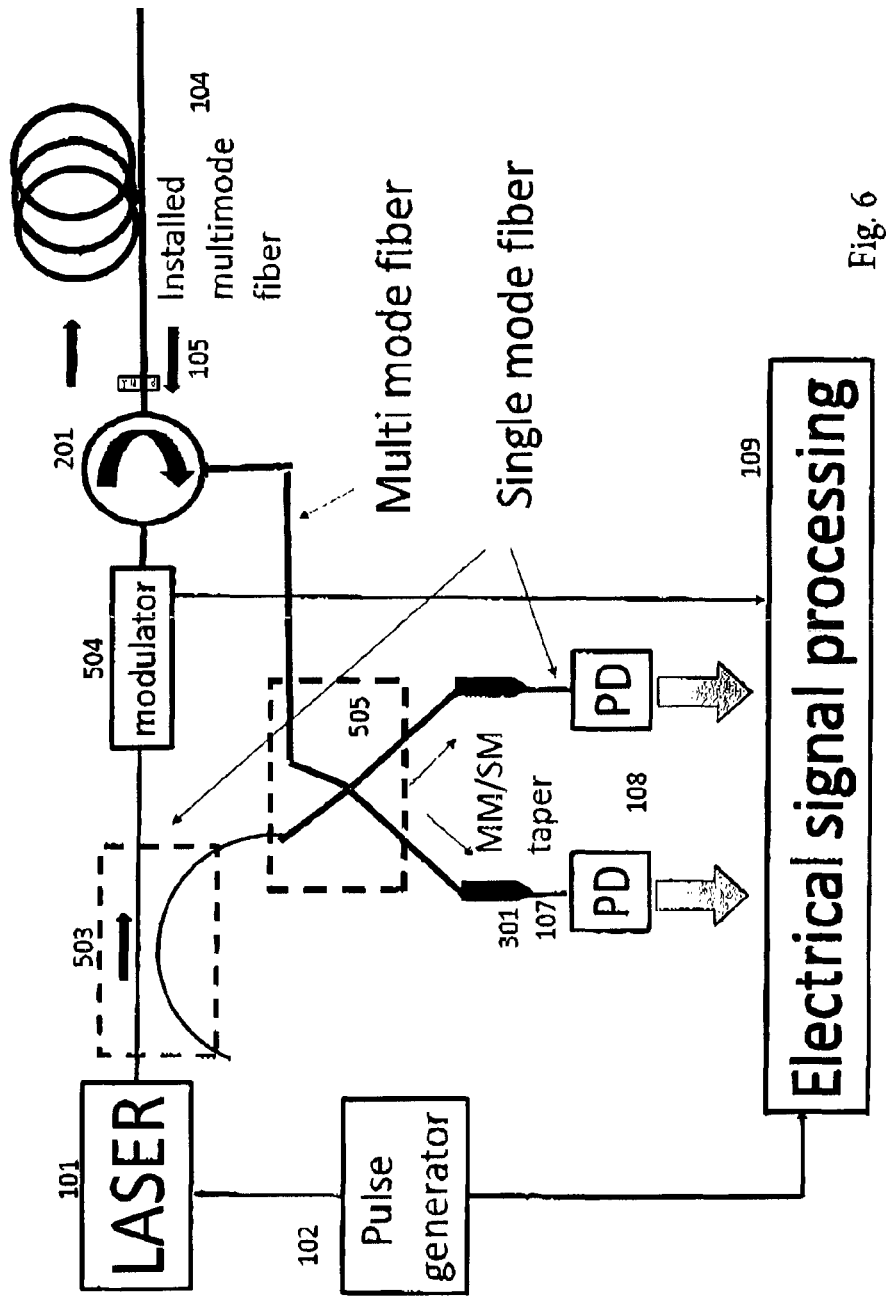

The diagram shown in FIG. 3 is similar to that in FIG. 1 in which the multimode outputs from coupler 106 are connected to single mode patch cord 107 by means of tapers 301 (see FIG. 6). The tapers may be provided in 2 ways:
  i) Limited intensity discharges are made after the fusion splicing of the single mode fibers with the multimode fiber in order to facilitate the diffusion of doping agents from the core to the cladding.
  ii) A very short length of fiber having few modes which has geometric characteristics and refractive index differences between the core and cladding, intermediate between those of the single mode fiber and the multimode fiber is placed in between.

Both solution i) and ii) make it possible to reduce coupling losses.

EXAMPLE 4

Figure 4:
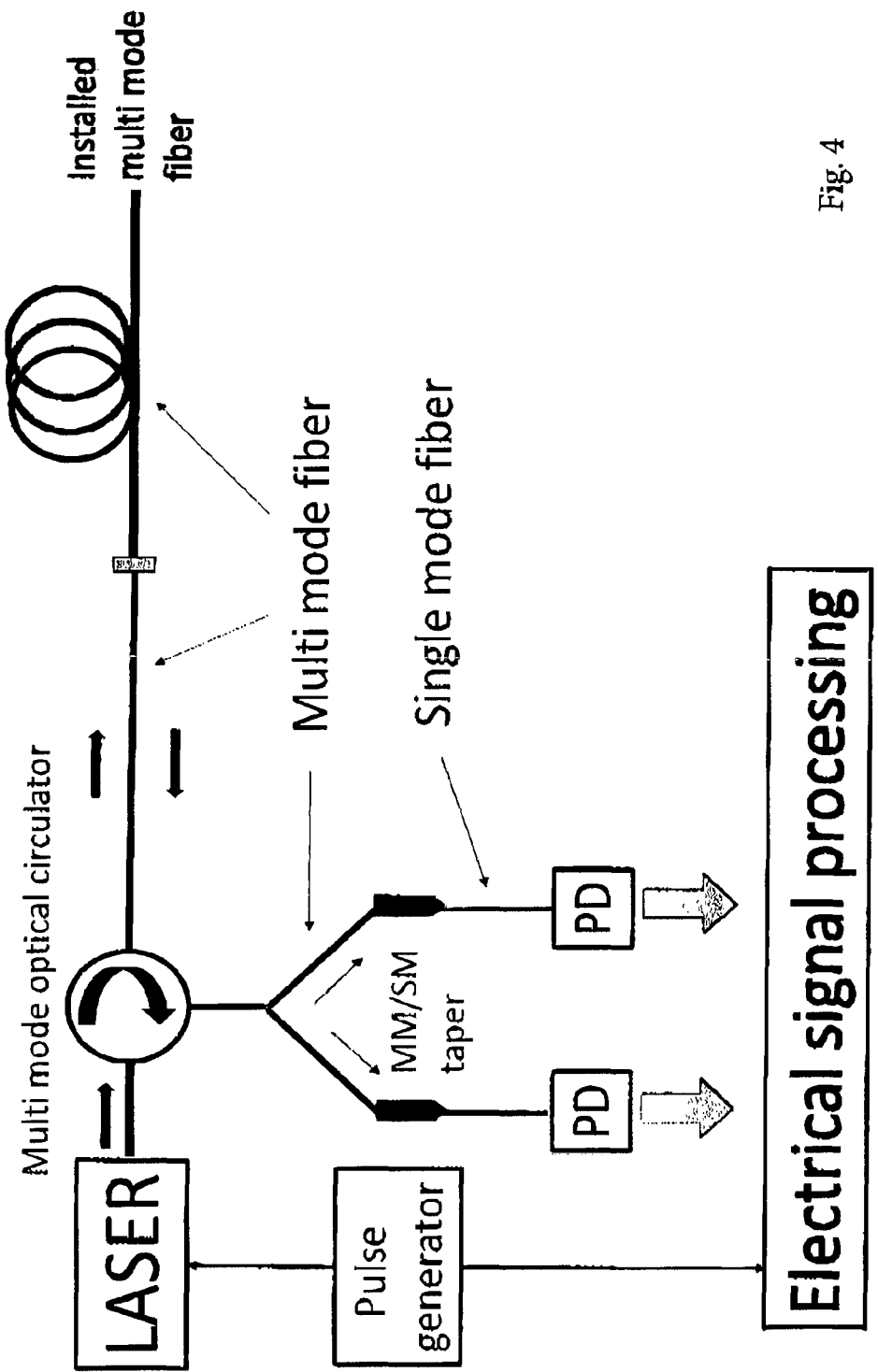

The diagram illustrated in FIG. 4 is similar to that in FIG. 2 with the insertion of two tapers 301.

EXAMPLE 5

Figure 5:
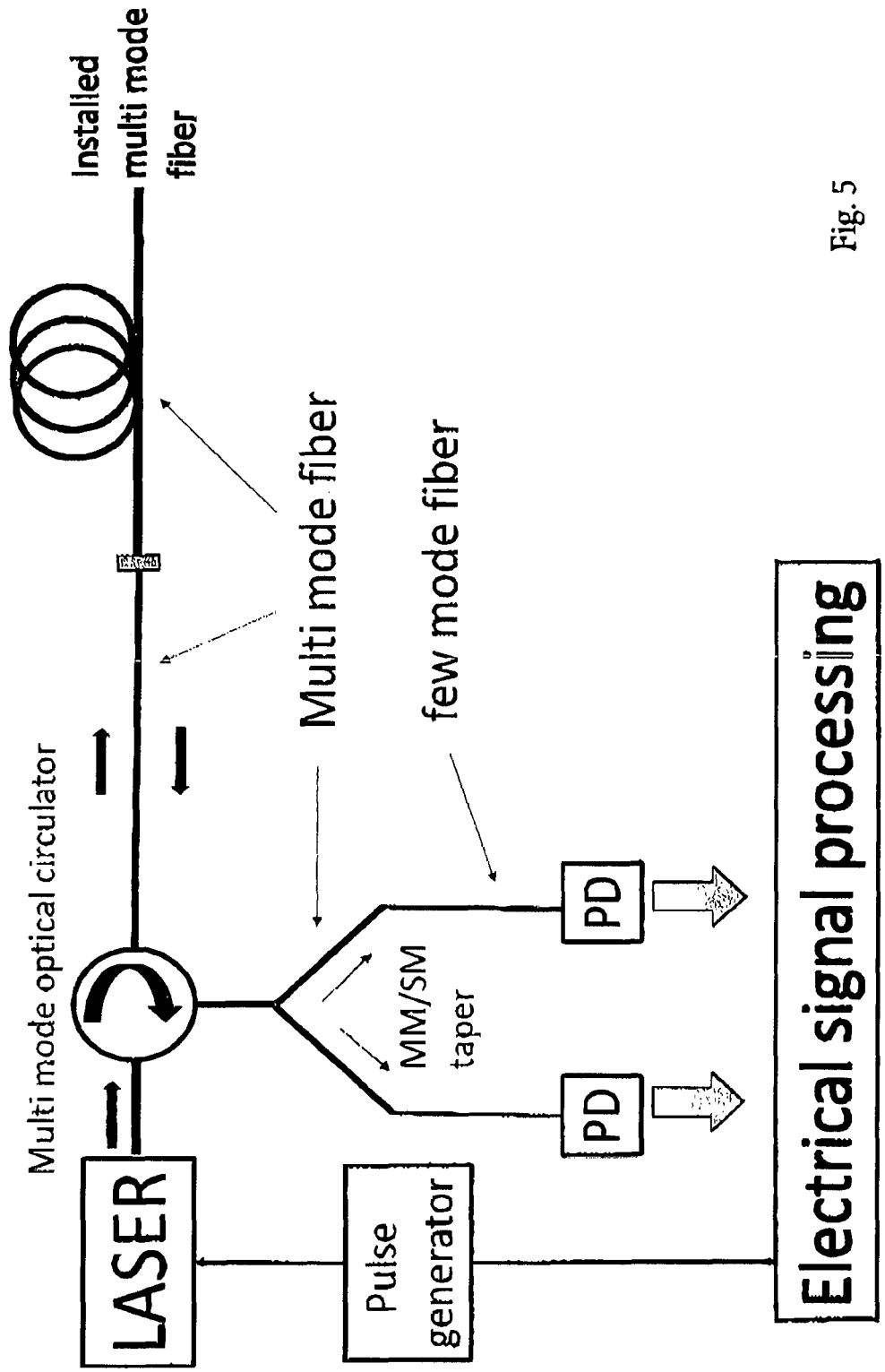

The diagram illustrated in FIG. 5 is similar to that in FIG. 2 with the insertion of short sections of few mode fibers, preferably 2, in front of the photodiodes.

EXAMPLE 6

The diagram illustrated in FIG. 6 is similar to that in FIG. 1 with the insertion of an acoustic-optical modulator (modulator) to produce a coherent receiver system which is possibly also sensitive to polarization.

EXAMPLE 7

Figure 7:
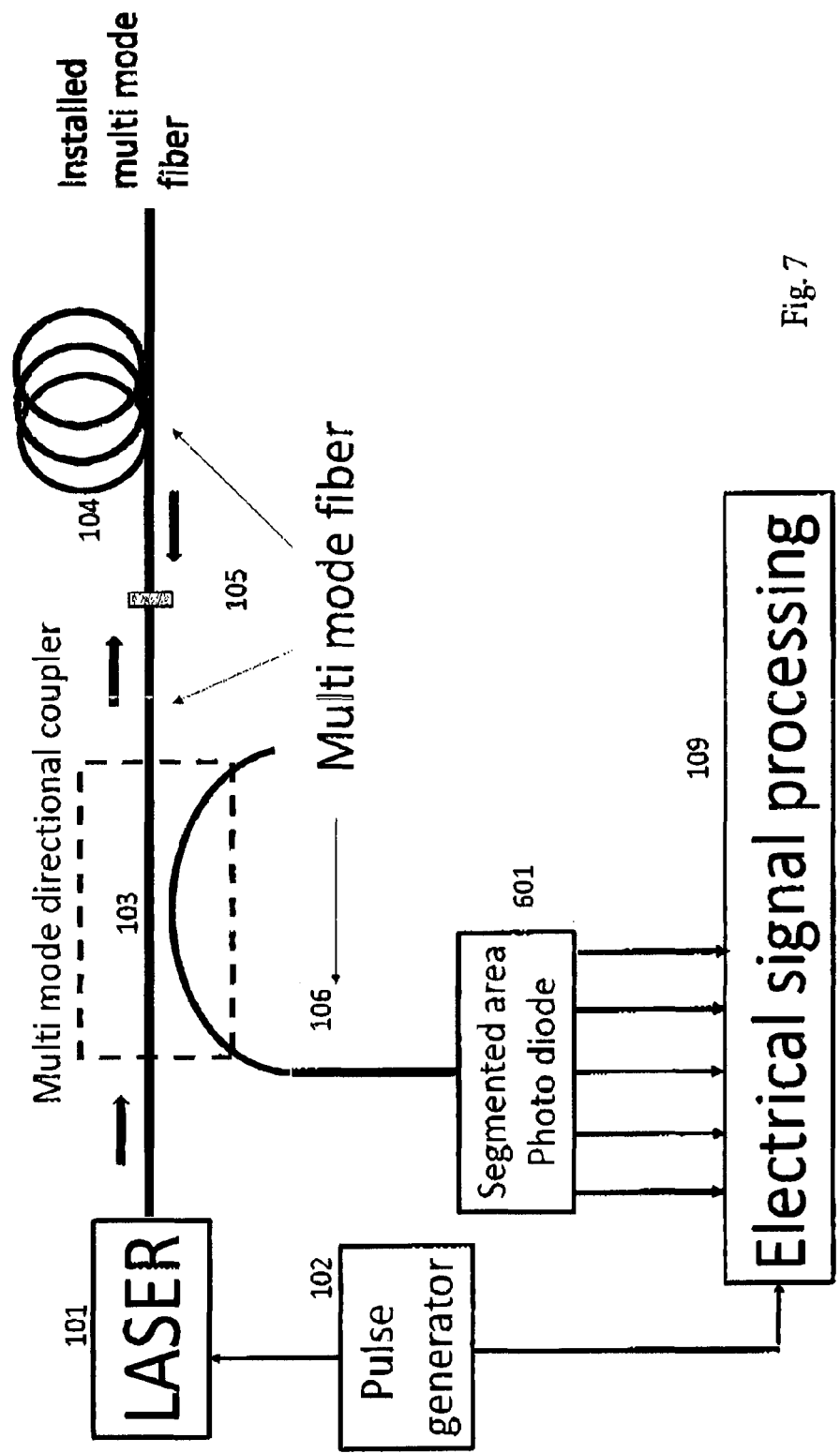

The diagram illustrated in FIG. 7 is similar to that in FIG. 1 with the insertion of a segmented area photodiode (segmented area photodiode) (2 or more independent sensitive areas) in the reception portion so as to produce an array of 2 or more receivers, each of which are sensitive to one speckle. The segmented area photodiode is sensitive to wavelengths between 800 and 1700 nm.

The invention claimed is:

1. Reflectometric vibration measurement system to monitor multiphase flows by multimode fibers comprising:
   a sensing multimode optical fiber;
   an optical source with at least one fiber output port, which generates optical pulses which are delivered to the sensing multimode optical fiber;
   an optical receiver with at least one multimode fiber input port;
   an optical device with at least three multimode fiber ports, in which one multimode fiber port is connected to said optical source, one multimode fiber port is connected to said optical receiver, and one multimode fiber port is connected to said sensing multimode optical fiber;
   a system for processing output signals from said optical receiver; and
   a spatial mode filter device disposed between said sensing multimode fiber and said optical receiver that is adapted to spatially separate multiple speckles of light backscattered from said sensing multimode optical fiber due to Rayleigh scattering induced by said optical pulses delivered to said sensing multimode optical fiber.

2. System according to claim 1, wherein said optical receiver comprises at least one photodiode.

3. System according to claim 2, including a fiber with few spatial modes coupled to said at least one photodiode.

4. System according to claim 3, wherein the guided modes of said fiber with few spatial modes are, counting the degenerate modes, fewer than 17.

5. System according to claim 2, wherein said optical receiver comprises at least two of said photodiodes.

6. System according to claim 5, including a multimode fiber power splitter, wherein said multimode fiber power splitter has one input port and a number of output ports substantially equal to the number of said photodiodes, and each output port of said multimode fiber power splitter being connected to each said photodiode by means of a monomode fiber section.

7. System according to claim 6, wherein said monomode fibers are connected to said multimode fibers by means of an adiabatic mode converter.

8. System according to claim 5, including a photonic lantern with a multimodal input and a number of monomode fiber outputs substantially equal to the number of said photodiodes, and each said monomode output of said photonic lantern being connected to each said photodiode.

9. System according to claim 1, wherein said optical device with said at least three multimode fiber ports is selected from:
   a directional coupler;
   power coupler/splitter;
   a circulator; and
   an optical switch.

10. System according to claim 1, wherein said optical source comprises one of the following:
   a high coherence laser that emits light pulses to the at least one fiber output port of said optical source;
   a high coherence laser, which generates continuous light, and an optical modulator connected to said laser, where said optical modulator generates optical pulses that are sent to the at least one fiber output port of said optical source.

11. System, heterodyne version, according to claim 1 where:
   said optical source has two said fiber output ports, and a first said fiber output port emits a modulated optical signal at a first frequency and a second said fiber output port emits an optical signal at a second frequency;
   said optical receiver has two input ports one of which is monomode and the other multimode, where said multimode input port is connected by multimode fiber to said optical device with at least three multimode fiber ports and said monomode input port is connected to said second fiber output port of said optical source.

12. System according to claim 11, including a polarization coupler/beam splitter with two inputs and two outputs, and two photodetectors, said polarization coupler/beam splitter comprising:
   a first multimode said input and a second monomode said input;
   said two outputs each coupled to one of said photodetectors;
   said two inputs equipped with optical systems capable of collimating the input optical beams;

a collimator of said second monomode input dimensioned to generate a collimated beam that substantially overlaps the fundamental mode of said first multimode input.

13. System according to claim 12, wherein said photodetectors are a segmented area photodiode, and wherein said collimator of said monomode input is dimensioned to generate a collimated beam that illuminates said segmented area of said photodiode substantially uniformly.

14. System according to claim 13, wherein said segmented area photodiode has at least two separate measurement segments.

15. System according to claim 13, wherein a few mode fiber with few spatial modes is coupled to said segmented area photodiode, wherein said few mode fiber is not monomode.

16. System according to claim 15, modes of said few mode fiber are, also counting the degenerate modes, fewer than 17.

17. System according to claim 11, including:
a spatial demultiplexer with a multimode input and at least two monomode outputs;
an optical splitter with one input and a number of outputs equal to said monomode outputs of said spatial demultiplexer;
a number of photodetectors equal to the number of said monomode outputs of said spatial demultiplexer;
a number of optical couplers equal to the number of said monomode outputs from said spatial demultiplexer, where each said optical coupler combines each said monomode output of said spatial demultiplexer with a different output from said optical splitter and directs the combined light to one of said photodetectors.

18. System according to claim 17 wherein said spatial demultiplexer includes a multimode fiber power splitter in which each multimode output is connected to a monomode fiber.

19. System according to claim 18, wherein said monomode fibers are connected to said multimode outputs by means of adiabatic mode converters.

20. System according to claim 17 wherein said spatial demultiplexer is a photonic lantern.

21. System according to claim 11, wherein said optical source includes a laser that emits continuous light and a three-port acoustic-optical modulator,
wherein the input port of said modulator is connected to the laser and the two output ports of said modulator are the fiber output ports of said optical source, and
wherein said modulator is configured to send short pulses to the first output port and substantially longer pulses to the second output port, wherein the second output port is connected to said monomode input port of said optical receiver.

22. Method for measurement of vibration along a structure to be monitored comprising:
providing a reflectometric vibration measurement system to monitor multiphase flows by multimode fibers comprising:
a sensing multimode optical fiber;
an optical source with at least one fiber output port, which generates optical pulses which are delivered to the sensing multimode optical fiber;
an optical receiver with at least one multimode fiber input port;
an optical device with at least three multimode fiber ports, in which one multimode fiber port is connected to said optical source, one multimode fiber port is connected to said optical receiver, and one multimode fiber port is connected to said sensing multimode optical fiber;
a system for processing output signals from said optical receiver, and more than one spatial mode filter;
finding said sensing multimode optical fiber installed along the structure to be monitored;
delivering said optical pulses to said sensing multimode optical fiber;
selecting multiple speckles of backscattered light from said sensing multimode optical fiber due to Rayleigh scattering induced by the delivered optical pulses;
generating a signal indicative of the vibrations along the monitored structure upon collecting the multiple speckles from said more than one spatial mode filter.

23. Method according to claim 22 also comprising the use of a multimode fiber to convey the backscattered light towards said optical receiver.

24. Method according to claim 22 wherein the multiple speckles are collected using one of the following:
a segmented area photodiode;
a multimode fiber power splitter with at least two output ports, where each is connected to a photodiode; and
a photonic lantern.

25. Method for the measurement of vibration along a structure by means of a system, heterodyne version, according to claim 22 comprising:
providing said optical source with two said fiber output ports, and a first said fiber output port emits a modulated optical signal at a first frequency and a second said fiber output port emits an optical signal at a second frequency;
providing said optical receiver with two input ports one of which is monomode and the other multimode, where said multimode input port is connected by multimode fiber to said optical device with at least three multimode fiber ports and said monomode input port is connected to said second fiber output port of said optical source;
dividing light produced by said optical source into two different optical paths;
modulating the light in the first optical path to form the optical pulse to be delivered to said sensing multimode optical fiber, while the light in the second optical path has an optical frequency different from that in the first optical path;
the light of the second optical path is combined with multiple speckles collected from said sensing multimode optical fiber; and
detecting only the signal at a frequency equal to the difference between the frequency of light in said first path and that of the light in said second path.

26. Method for reconfiguring an optical reflectometry system already installed in a structure to be monitored, comprising a sensing multimode optical fiber installed along said structure, a source for delivering pulses to said sensing multimode optical fiber, an optical receiver for receiving backscattered light from said sensing multimode optical fiber due to Rayleigh scattering induced by the delivered pulses, comprising placing a spatial mode filter device between said sensing multimode optical fiber and said optical receiver for spatially separating multiple speckles of the light backscattered from said sensing multimode optical fiber.

27. Method according to claim 26 wherein the spatial mode filter device for spatially separating multiple speckles comprises one of the following:

a multimode fiber power splitter, in which each output is connected to a photodiode;
a multimode fiber coupled to a segmented area photodiode; and
a photonic lantern, in which each output is connected to a photodiode.

28. Method according to claim 26 further comprising also generating a signal indicative of the vibration along the monitored structure by means of an analysis system based on multiple recorded speckles.

* * * * *